United States Patent [19]

Adell

[11] Patent Number: 4,587,762
[45] Date of Patent: May 13, 1986

[54] EDGE GUARD WITH INTEGRAL ATTACHING FLANGE

[75] Inventor: Robert Adell, Sunnyvale, Tex.

[73] Assignee: U.S. Product Development Company, Sunnyvale, Tex.

[21] Appl. No.: 646,598

[22] Filed: Aug. 31, 1984

[51] Int. Cl.⁴ ............................................. B60J 5/00
[52] U.S. Cl. ........................................ 49/462; 52/716
[58] Field of Search ..................... 49/462, 460, 492; 52/716, 717, 718

[56] References Cited

U.S. PATENT DOCUMENTS

| | | | |
|---|---|---|---|
| 1,037,720 | 9/1912 | Baumruk | 49/460 |
| 2,740,658 | 4/1956 | Kesich | 49/462 |
| 3,059,292 | 10/1962 | Harris | 49/492 |
| 3,139,784 | 7/1964 | Moorman | 49/492 X |
| 3,167,827 | 2/1965 | Alley et al. | 49/492 |
| 3,494,075 | 2/1970 | Kunevicius | 52/716 X |
| 3,547,515 | 12/1970 | Shanok et al. | 49/462 X |
| 4,338,148 | 7/1982 | Adell | 49/462 X |
| 4,363,838 | 12/1982 | Schmidt et al. | 52/716 X |
| 4,436,336 | 3/1984 | Shimizu | 49/462 X |

Primary Examiner—Philip C. Kannan
Attorney, Agent, or Firm—Stephenson & Boller

[57] ABSTRACT

An edge guard with an integral attaching flange is disclosed for use on the trailing edge of a swinging closure in an automotive vehicle, such as a door. The edge guard comprises a generally U-shaped portion fitting onto the trailing edge and an attaching flange extending from an inner leg of the U-shaped portion. A fastening means is provided for coaction between the flange portion of the edge guard and an inner panel of the door. A separate fastening device can be used for the attachment and is illustrated to include a light-reflective medium on the fastener's head which, at night when the door is open, will reflect the headlights of another vehicle approaching from the rear. Plural embodiments are disclosed including non-metallic embodiments and insulated metal embodiments.

16 Claims, 6 Drawing Figures

EDGE GUARD WITH INTEGRAL ATTACHING FLANGE

BACKGROUND AND SUMMARY OF THE INVENTION

This invention relates to edge guards and specifically it relates to an edge guard which is adapted for fitting onto the trailing edge of a swinging closure such as a door edge in an automobile.

Edge guards of the general type to which the present invention relates are disclosed in a number of applicant's issued U.S. patents such as U.S. Pat. No. 4,259,812
U.S. Pat. No. 4,316,348
U.S. Pat. No. 4,334,700
U.S. Pat. No. 4,338,148
U.S. Pat. No. 4,365,450
U.S. Pat. No. 4,377,056
U.S. Pat. No. 4,379,376
U.S. Pat. No. 4,369,377
U.S. Pat. No. 4,387,125

There are also a number of applicant's pending patent applications relating to this general subject which are known to the Patent Office by virtue of their pendency.

When applied to the trailing edge of a swinging closure such as an automobile door, an edge guard provides a protective function guarding the door edge from damage when the door is swung open against an object in the path of travel of the swinging door's edge.

In the usual automobile door construction the trailing edge comprises marginal portions of inner and outer sheet metal door panels wrapped together and welded. This is commonly referred to as a hem flange. While the automobile door is painted, the edge is subject to chipping, marring and attendant adverse effects such as rusting and corrosion. Without door edge guards to provide protection these effects can lead to unsightly appearance and loss of value for an automobile.

It is also desirable that the edge guards provide an attractive decorative appearance since a portion of the edge guard on the outside of the door edge will be visible when the automobile is viewed from the side. Depending upon styling considerations the door edge guard may be a bright metal or it may be color-coordinated with the painted color of the automobile.

Applicant's inventions are also directed toward both bright metal door edge guards as well as color-coordinated door edge guards. In this regard, bright door metal edge guards may be constructed from any suitable metal, stainless steel, or bi-metal for example, and provided with a protective insulation so that the possibility of electrochemical action occurring between the metal of the edge guard and the metal of the door is minimized. In other words, such insulation is intended to guard against rusting. Applicant has also pointed out the desirability of having door edge guards self-retaining.

Other of applicant's inventions relate to solely non-metallic door edge guards which can also provide protective and decorative functions without the use of a self-retaining metal channel. Such edge guards, which are typically plastic, can be directly colored with a suitable coloring so that the finished product has the desired color.

The present invention in the disclosed embodiment of the drawings may be generally considered as a non-self-retaining edge guard since it uses a fastening means. In other words the edge guard does not retain itself solely by its leg exerting oppositely directed forces against opposite sides of the door edge.

A particular advantage of the invention is that a given design of door edge guard can stand a wider tolerance in the door hem flange thickness, yet still be readily and securely installed, and provide the desired protective function.

It may also be desirable for a door edge guard to comprise a light reflective medium which can promote night time safety under certain conditions of the door's operation, i.e. when the door is open.

A related aspect of the present invention involves an edge guard which can promote night time safety and which can do so in a manner which does not impair the appearance of the edge guard at other times. Moreover this aspect is advantageous in that the night time reflector feature can be associated with fastening means which are used to fasten the edge guard on the door edge.

Thus the present invention has many attributes including the tendency to resist rusting, thereby promoting a long attractive appearance, providing a protective function for the door edge against paint chipping, marring, scuffing, etc., and promoting night time safety.

The foregoing features, advantages, and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

DESCRIPTION OF THE PREFERRED EMBODIMENT

Figure 1:
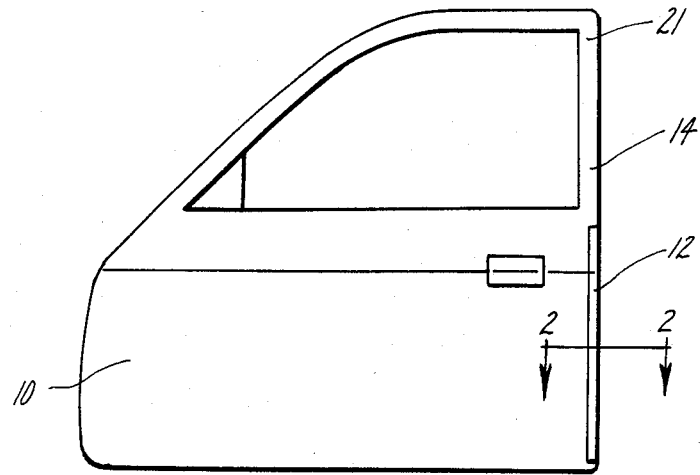
FIG. 1 is a side elevational view of an automobile door containing an edge guard embodying principles of the present invention.

FIG. 1 illustrates an automobile door 10 containing a door edge guard 12 embodying principles of the present invention. The illustration is of a left front door of an automobile with the edge guard 12 being applied to a portion of the door's trailing edge 14.

Figure 2:
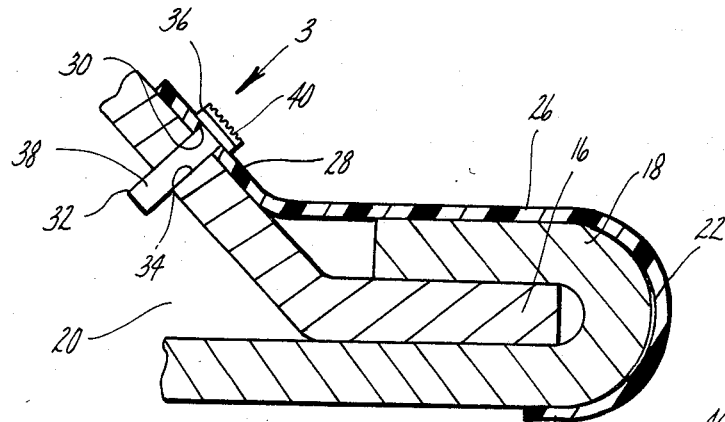
FIG. 2 is an enlarged fragmentary horizontal sectional view taken in the direction of arrows 2—2 in FIG. 1.

Referring also to FIG. 2 the trailing edge 14 is shown to be formed by an inner door panel 16 and outer door panel 18. The illustrated construction is commonly known as a hem flange wherein a marginal portion of the outer door panel sheet metal is wrapped around a marginal portion of the inner panel sheet metal. The outer door panel 18 provides the outer appearance of the door while the inner panel is disposed on the interior of the outer panel with the two panels cooperatively defining an interior space 20.

Door 10 is shown in FIG. 1 to include a window frame 21 and the full trailing edge of the illustrated door is not covered by the illustrated edge guard, but rather only about the lower half of the traling edge as shown in the drawing figure. The door will typically have a sweep whereby the lower main portion protrudes more than the window frame, and therefore there is usually no necessity for extending the edge guard along the rear edge of the window frame; however it will be appreciated that principles of the invention are applicable to any edge guard construction for the trailing edge of swinging closures whether the edge guard extends the full length of the trailing edge of any given swinging closure or a lesser amount.

Edge guard 12 is illustrated as being fabricated of a suitable plastic material, PVC being one such example. Hence it may be formed by any of the usual processes, extrusion being a suitable process.

Edge guard 12 comprises a generally U-shaped portion 22 fitting with close conformity onto trailing edge 14. The U-shaped portion 22 may be considered as comprising an outer leg 24 disposed against that outside of the door edge and an inner leg 26 disposed on the inside. Hence with the door in the closed position, only outer leg 24 is presented to view from the side of the vehicle.

It will be appreciated that the illustrated U-shape is merely representative and that the exact U-shape for any given edge guard will depend upon the particular construction of the hem flange, styling requirements, and any other requirements which may be deemed relevant. Moreover it is unimportant whether the inner and outer legs have equal or unequal lengths. Reference to a U-shape may be deemed to include what may be considered as J-shapes, V-shapes, or C-shapes.

A flange portion 28 extends from U-shaped portion 22, extending from inner leg 26. Flange portion 28 is disposed against inner panel 16 and extends beyond trailing edge 14 so as to overlie interior space 20. Flange portion 28 provides for the attachment of the edge guard to the door.

The preferred technique for fastening is to provide one or more holes 30 in flange portion 28 where it overlies inner panel 16 and interior space 20 and to use a fastener 32 at each hole 30 for fastening of the flange portion to the inner door panel. For this purpose the inner door panel is provided with one or more holes 34 for registry with holes 30. The preferred mechanical fastener for making attachment comprises a head 36 and a shank 38. Attachment is made by passing the distal end of shank 38 first through a hole 30 and then through a hole 34 such that in the final fastening position head 36 is disposed against flange portion 28 and the distal end of the fastener is disposed in interior space 20. Desirably the fastener is non-metallic so as to avoid metal-to-metal contact. The fastener shank can be of any suitable construction. For example it can be threaded to have a threaded engagement, or it can be bifurcated so as to pass through the registered holes with the distal end slightly expanding after it has passed through into the interior space 20. Other forms of fastening are also contemplated.

The number of points of attachment of the edge guard to the inner panel will depend upon various factors, the most significant probably being the overall length of the edge guard.

With this construction it can therefore be seen that the entire attachment takes place on the inside of the door so that the outside appearance in no way discloses how the attachment is made. Rather only the outer leg of the edge guard is seen when the door is closed. The thickness of the edge guard and its material will determine the protective characteristics and hence these may be chosen in accordance with expected type of disturbances and hazards which the edge guard is intended to protect against. It is possible for the edge guard to be made of sufficient body and dimensioned across the throat of the U-shaped portion 22 less than the thickness of the door hem flange whereby when the edge guard is being applied to the door edge the U-shaped portion slightly resiliently spreads open to fit onto the door with the edge guard exerting a force onto opposite sides. This force however would not alone be satisfactory to ensure permanent retention over the expected usage, and hence the edge guard of the present invention would not generally be deemed to fall in the class of self-retaining edge guards even though there may be a resilently forceful engagement of the U-shaped portion with the hem flange of the door. Attachment is only to the inner panel and this is of advantage since there is no attachment to the outer panel whatsoever.

Because the edge guard is not solely self-retaining via its U-shaped portion, there is an improved accommodation for variations in thickness of the door hem flange. In actual automobile manufacture a tolerance is established for the thickness of the hem flange; however, for various reasons there can be significant departures outside of this range of tolerance which induce problems in door edge guards which are designed to fit onto edge guards which fall within the specified tolerance. Hem flanges whose thickness are outside the tolerance have in the past been known to create problems in providing suitable door edge guard attachment, particularly for self-retaining edge guards, despite the fact that the edge guards conform to the automobile manufacturer's specifications. Thus, the present invention addresses that situation. Moreover with the invention it is possible to conform the edge guard to sweep in the door's trailing edge, even compound sweeps. It would be possible in extreme cases to provide notching of the inner legs if desired for severe sweeps but it is believed that in general a continuous flange 28 will most often be suitable.

Figure 3:
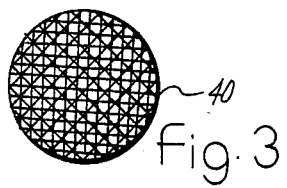
FIG. 3 is a fragmentary view looking in the direction of arrow 3 in FIG. 2.

The invention also provides a further advantageous aspect in that it can incorporate a safety-promoting night time reflective feature. Moreover this feature can be embodied and is in fact herein disclosed in the drawing as being embodied in the fastening means although it will be appreciated that the same could be incorporated elsewhere in the edge guard if desired. Looking to FIGS. 2 and 3, the reader will see on the head 36 of fastener 32 is a light-reflective medium 40. This is shown to have a circular shape like the fastener's head 36. When the door is closed, the head of the fastener is of course not visible from the side of the vehicle. However when the door is swung open, the inner leg 26 and flange 28 of the edge guard can be viewed from the rear side of the vehicle. By making the fastener head with the light-reflective medium 40, light shining from the rear will be reflected by the reflective medium when the door is opened. For example when the automobile is stopped along the road at night and the door is swung open, another vehicle approaching from the rear with its headlights on will see the reflected light from the reflective heads 40 of the fasteners. The preferred construction for the reflectorized medium 40 comprises any means for providing an internal reflection, for example embedded glass or metal fragments in a transparent medium, or a multitude of small prismatic elements which will provide internal reflection such as is typically imparted into an automobile's rear taillight lenses.

With this aspect of the invention as illustrated in application of the reflective medium to the head of a fastener used to attach the door edge guard, it is unnecessary to incorporate the reflective medium into the edge guard itself but certainly if desired that could be done.

Figure 4:
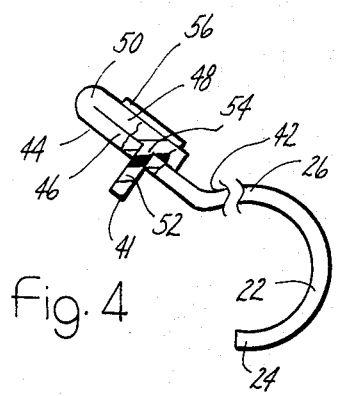
FIG. 4 is a view similar to the view of FIG. 2 of another edge guard embodying principles of the invention but shown by itself.

For example FIG. 4 illustrates a construction which in certain respects is similar to that of FIG. 2 with like components being identified by the same reference numeral. The arrangement for the fastening differs slightly as does the arrangement for providing the reflective medium.

In FIG. 4 a fastener 41 is formed integrally with the edge guard 42 with the edge guard 42 having a flange portion 44 comprising a pair of overlying layers 46, 48 respectively. Layer 48 is on the outside and layer 46 on the inside. The two layers are joined along an integral fold 50 with a fastening shank 52 being formed on layer 48 and a hole 54 in layer 46. The outer layer 48 is folded back against the inner layer 46 about fold 50 so as to pass shank 52 through hole 54 with the shank then extending on through hole 34 in the inner panel 16. A light-reflective medium 56 is on the outside surface of outer layer 48 and can take any suitable form such as the circular form shown in FIG. 3 or it could be an elongate strip extending along the length of the edge guard.

FIGS. 2 and 4 have illustrated edge guards fabricated from plastic. The invention may also be embodied in insulated metal edge guards such as shown in FIGS. 5 and 6.

Figure 5:
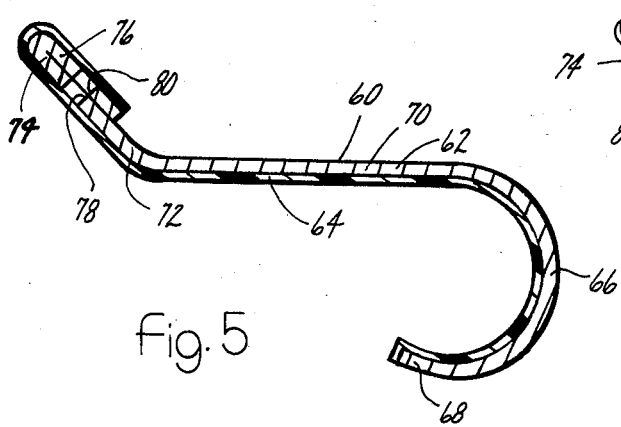
FIG. 5 is a view similar FIG. 2 of a still further embodiment of edge guard by itself.

The embodiment shown in FIG. 5 is identified by the reference numeral 60 and it comprises a metal part 62 and plastic part 64. The plastic part 64 may be in the form of a thin film of plastic so as to insulate the metal 62 part from the door edge. Edge guard 60 is formed into the same general shape as the preceding embodiments of edge guard to have a generally U-shaped portion 66, an outer leg 68, an inner leg 70 and a flange portion 72. The flange portion 72 comprises overlying layers 74 and 76 with aligned holes 78 and 80. The fastening accomplished by passing a fastener (not shown) through the holes 78 and 80 and into a registering hole such as 34 in the inner door panel 16. The insulation may be deposited on the metal by any suitable means such as laminating film, or by extrusion. If desired, insulation could be extended from the inside of the outer leg, around the distal end edge of that leg and back around the outside of that same leg. That insulation could be color-coordinated with the color of the door whereby the metal of the edge guard would not be exposed as viewed in the direction of FIG. 1.

Figure 6:
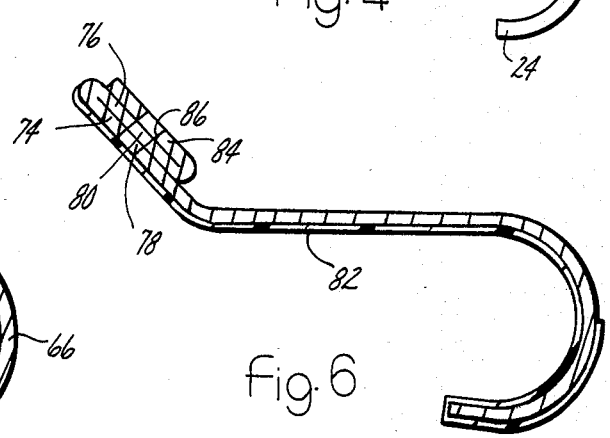
FIG. 6 is a view similar to FIG. 2 illustrating yet another embodiment by itself.

The embodiment 82 of FIG. 6 is somewhat similar to the embodiment of FIG. 5 but it comprises three overlying layers at the attaching flange including an additional fold 84 containing a hole 86 which aligns with holes 80 and 78. The attachment is accomplished by passing a fastener through the three holes 78, 80 and 86 and into a hole such as 34 in the inner door panel 16. FIG. 6 illustrates an edge guard in which the insulation extends around the outer leg so as to be color coordinated with the door.

While the thicknesses of the metal and plastic will depend upon specific requirements, the metal will typically be quite thin since it does not have to exert a self-retention force via its U-shaped portion. A bead on the distal end of the outer leg is optional.

While a preferred embodiment of the invention has been disclosed, it will be appreciated that principles are applicable to other embodiments.

What is claimed is:

1. In combination with a swinging closure having a trailing edge cooperatively defined by an outer panel and an inner panel having respective margins secured together and wherein the two panels bound an interior space adjacent the trailing edge, an edge guard for at least a portion of the trailing edge comprising in transverse cross section a generally U-shaped portion fitting onto the trailing edge and a flange portion projecting from said U-shaped portion and against said inner panel to overlie said interior space, and fastening means for fastening the edge guard to the swinging closure comprising means coacting between said flange portion and said inner panel where said flange portion overlies said interior space in which said means coacting between said flange portion and said inner panel comprises a mechanical fastening device, said inner panel is provided with a hole through which said mechanical fastening device passes, a light reflective means is cooperatively associated with said edge guard along the inner panel and is disposed to overlie said mechanical fastening device, said light-reflective means comprising means providing an internal reflection of incident light so that light is reflected back along the direction of incidence.

2. The combination set forth in claim 1 in which said edge guard and said fastening means are both non-metallic.

3. The combination set forth in claim 1 in which said edge guard comprises metal with a non-metallic insulating layer between the edge guard's metal and the trailing edge of the swinging closure.

4. The combination set forth in claim 1 in which said flange portion is continuous along the length of the edge guard.

5. The combination set forth in claim 1 in which said mechanical fastening device is integral with said edge guard.

6. The combination set forth in claim 1 in which said mechanical fastening device is a member separate from said edge guard but acting to fasten the edge guard on the swinging closure.

7. In combination with a swinging closure having a trailing edge cooperatively defined by an outer panel and an inner panel having respective margins secured together and wherein the two panels bound an interior space adjacent the trailing edge, an edge guard for at least a portion of the trailing edge comprising in transverse cross section a generally U-shaped portion fitting onto the trailing edge and a flange portion projecting from said U-shaped portion and against said inner panel to overlie said interior space, and fastening means for fastening the edge guard to the swinging closure comprising means coacting between said flange portion and said inner panel where said flange portion overlies said interior space, in which said flange portion is continuous along the length of the edge guard and comprises plural overlying layers, said means coacting between said flange portion and said inner panel comprises a mechanical fastener coacting with said overlying layers and passing into a hole in said inner panel, and said mechanical fastener is integral with said edge guard at one of said overlying layers and passes through a hole in another of said overlying layers.

8. The combination set forth in claim 7 including a light-reflective medium on said one overlying layer on a surface thereof opposite said mechanical fastener, said light-reflective medium being disposed to promote night time safety by the bright reflection of incident light when the swinging closure is in an open position.

9. In combination with a swinging closure having a trailing edge, an edge guard member fitting onto said trailing edge and one or more fastening members separate from said edge guard member but acting to fasten the edge guard member to the swinging closure, the improvement comprising light-reflective means on said one or more separate fastening members for promoting night time safety by the bright reflection of incident light when the swinging closure is in an open position, said light-reflective means comprising means providing an internal reflection of incident light so that light is reflected back along the direction of incidence.

10. The improvement set forth in claim 9 in which said one or more separate fastening members each comprises a head portion and a shank portion, said shank portion passing through a corresponding hole in said edge guard member and into a corresponding hole in the swinging closure, said head portion being disposed to overlie an exterior portion of the edge guard member, and said light-reflective means being disposed on said head portion.

11. The improvement set forth in claim 10 in which said edge guard member includes a generally U-shaped portion fitting onto the trailing edge of the swinging closure and a flange portion extending from said U-shaped portion, said one or more separate fastening members passing through said flange portion.

12. The improvement set forth in claim 11 in which said swinging closure comprises said trailing edge being cooperatively defined by an outer panel and an inner panel having respective margins secured together and said two panels bounding an interior space adjacent said trailing edge, said flange portion being disposed against said inner panel and overlying said interior space, said shank of each of said one or more separate fastening members passing through said inner panel and penetrating said interior space.

13. The improvement set forth in claim 10 in which said head portion is of a circular diameter greater than the maximum diameter of said shank portion.

14. The improvement set forth in claim 13 in which said light-reflective means has a circular shape of essentially the same diameter as said head.

15. The improvement set forth in claim 14 in which said light-reflective means is a member disposed on the end of said head.

16. In combination with a swinging closure having a trailing edge cooperatively defined by an outer panel and an inner panel having respective margins secured together and wherein the two panels bound an interior space adjacent the trailing edge, an edge guard for at least a portion of the trailing edge comprising in transverse cross section a generally U-shaped portion fitting onto the trailing edge and a flange portion projecting from said U-shaped portion and against said inner panel to overlie said interior space, and fastening means for fastening the edge guard to the swinging closure comprising means coacting between said flange portion and said inner panel where said flange portion overlies said interior space and in which said flange portion comprises plural overlying layers said means coacting between said flange portion and said inner panel comprising a mechanical fastener coacting with said overlying layers and passing into a hole in said inner panel, and said mechanical fastener is integral with said edge guard at one of said overlying layers and passes through a hole in another of said overlying layers.

* * * * *